(12) United States Patent
Campbell et al.

(10) Patent No.: US 6,585,017 B1
(45) Date of Patent: Jul. 1, 2003

(54) THICKNESS PLANER WITH LOCKING MECHANISM

(75) Inventors: Randall E. Campbell, Hazelwood, MO (US); Paul Eckhoff, O'Fallon, MO (US); Liao Juei-Seng, Tali (TW)

(73) Assignee: Emerson Electric Co., St. Louis, MO (US)

( * ) Notice: Subject to any disclaimer, the term of this patent is extended or adjusted under 35 U.S.C. 154(b) by 141 days.

(21) Appl. No.: 09/630,254

(22) Filed: Aug. 1, 2000

(51) Int. Cl.$^7$ ................................................ B27C 1/00
(52) U.S. Cl. .................. 144/117.1; 144/130; 144/114.1
(58) Field of Search ................ 144/114.1, 117.1, 144/129, 130; 33/626, 628, 630, 640, 642; 409/210, 214, 218, 220

(56) References Cited

U.S. PATENT DOCUMENTS

| | | |
|---|---|---|
| 1,802,096 A | 4/1931 | Tautz |
| 2,577,975 A | 12/1951 | Moore ...................... 144/117.1 |
| 2,624,382 A | 1/1953 | Moore ........................ 144/116 |
| 2,780,251 A | 2/1957 | Williams .................... 144/130 |
| 3,545,140 A | 12/1970 | Jones .......................... 51/170 |
| 3,718,168 A | 2/1973 | Berends ...................... 144/117 |
| 3,785,416 A | 1/1974 | Anthony ..................... 144/116 |
| 3,913,642 A | 10/1975 | Porter ...................... 144/114.1 |
| 4,067,370 A | 1/1978 | Chang ...................... 144/117.1 |
| 4,118,141 A | 10/1978 | Spohn, Jr. .................... 408/90 |
| 4,335,768 A | 6/1982 | Bachmann ............... 144/114.1 |
| 4,363,343 A | 12/1982 | Cuneo ........................... 145/4 |
| 4,394,878 A | 7/1983 | Rice et al. .................. 144/116 |
| 4,436,126 A | 3/1984 | Lawson .................... 144/114.1 |
| 4,436,462 A | 3/1984 | Martinez .................... 409/218 |
| 4,440,204 A | 4/1984 | Bartlett ....................... 144/130 |
| 4,457,350 A | 7/1984 | Finnila ........................ 144/2.1 |
| 4,485,859 A | 12/1984 | Krogstad et al. ......... 144/117.1 |
| 4,932,448 A | 6/1990 | Maioli et al. ............. 144/117.1 |
| 4,991,636 A | 2/1991 | Robson ....................... 144/116 |
| 5,174,348 A | 12/1992 | Miyamoto et al. ....... 144/117.1 |
| 5,176,190 A | 1/1993 | Miyamoto et al. ....... 144/117.1 |
| 5,284,192 A | 2/1994 | Sato et al. ................ 144/117.1 |
| 5,771,949 A | 6/1998 | Welsh et al. ................ 144/130 |
| 5,794,675 A | 8/1998 | Garcia ..................... 144/117.1 |
| 5,927,357 A | 7/1999 | Welsh et al. ................ 144/130 |
| 6,085,812 A * | 7/2000 | Chiang ..................... 144/117.1 |
| 6,123,125 A * | 9/2000 | Liao ......................... 144/117.1 |
| 6,279,628 B1 * | 8/2001 | Chang ........................ 144/130 |

FOREIGN PATENT DOCUMENTS

| | | |
|---|---|---|
| DE | 760 672 | 3/1954 |
| DE | 3541728 A1 | 3/1954 |
| DE | 1068129 | 10/1959 |
| DE | 2552484 | 5/1977 |
| DE | 3615978 A1 | 11/1986 |

OTHER PUBLICATIONS

Delta Machinery Internet pages; Oct. 24, 2000 (6 pages).
DeWalt Internet pages; Oct. 24, 2000 (3pages).

* cited by examiner

Primary Examiner—W. Donald Bray
(74) Attorney, Agent, or Firm—Howrey Simon Arnold & White, LLP

(57) ABSTRACT

A thickness planer is described having a carriage locking mechanism to minimize vibration and movement of the carriage during the planing operation. Also described is a depth of cut indicator to display the thickness of the material to be removed during the planing operation. A mechanism is also disclosed for facilitating setting the carriage and cutting head to a predetermined height over the base quickly and accurately.

28 Claims, 15 Drawing Sheets

THICKNESS PLANER WITH LOCKING MECHANISM

BACKGROUND OF THE INVENTION

1. Field of the Invention

The invention relates to a thickness planing apparatus. More particularly, this invention relates to a thickness planer having a carriage locking mechanism to minimize vibration and movement of the carriage during the planing operation. This invention includes a depth of cut indicator to display the thickness of the wood to be removed during the planing operation. This invention further includes a mechanism for facilitating setting the carriage and cutting head to a predetermined height over the to base, quickly and accurately for planing a workpiece to predetermined thicknesses.

2. Description of the Related Art

Planing a workpiece is a common operation in the field of woodworking. Planing is the removal of wood from a surface or face of a board so as to make it flat, uniform, and smooth.

It is generally known that a typical thickness planer is comprised of a base upon which support columns are perpendicularly mounted. Supported by the support columns is a carriage that houses a rotating cutting head. The cutting head has at least one cutting knife which, when rotated, removes material from the workpiece passing through the planer.

A lead screw is generally provided to adjust the height of the carriage above the base. Since the cutting head is rotatably attached to the carriage, the height of the carriage determines the thickness of the workpiece exiting the planer. The difference between the thickness of the workpiece entering the planer and the thickness of the workpiece exiting the planer is the depth of cut. The depth of cut is the thickness of the workpiece being removed by one pass through the thickness planer.

A motor-powered infeed roller pulls the workpiece into the planer, while an outfeed roller assists the workpiece to exit the planer. Also standard components on a known thickness planer are an infeed table and an outfeed table.

To provide versatility in a commercial thickness planer, it is common for the carriage to be adjustable to different heights. However, during the cutting operation, it is preferred that the carriage be securely attached to the housing of the thickness planer. Otherwise, vibration and movement of the carriage during the planing operation may produce undesired "snipe" or localized variations in the workpiece thickness. This undesired vibration and movement is especially prevalent when the workpiece is entering or exiting the thickness planer, i.e. at the beginning and end of a cut.

In some thickness planers, the base is stationary and the carriage moves to adjust the height of the carriage with respect to the base. In other versions of thickness planers, the carriage is stationary and the base moves to adjust the distance the base extends below the carriage.

Multiple attempts to provide carriage locks have been attempted. For example, U.S. Pat. No. 5,794,675 to Garcia discloses a locking assembly containing forks running the length of the support columns. By deflecting these long forks and sandwiching them between the carriage and the support columns, friction secures the carriage. Further, Garcia attempts to lock the carriage in line with the cutting head instead of locking the carriage at a location away from the cutting head. It has been found that the close proximity of the locking mechanism to the cutting head may not provide adequate stability when locking the carriage.

Another attempt to provide a carriage lock is disclosed in U.S. Pat. No. 5,771,949 to Welsh et al. Disclosed in this patent are various resiliently deflectable mechanisms having springs, levers, or more resiliently deflectable members to secure the carriage at a given height.

However, because of the geometries, systems of the prior art fail to produce a mechanical advantage to reduce the amount of force necessary to lock the carriage, compared to the holding strength of the locking mechanism. Further, because the systems disclosed in prior art systems rely upon resiliently deflected members, these systems over time fatigue and become less effective at securing the carriage. Further, the prior art systems utilize fixed links or rods to indicate the braking and locking action. Not only do these systems lose their effectiveness over time, but also they require maintenance of the worn, fixed links.

Thus, there is a need for a mechanism which minimizes the amount of snipe in a workpiece by minimizing the movement and vibration of the cutter head and carriage. Further, there is a need for the mechanism to require a small amount of force to lock the carriage into place, yet securely lock the carriage.

Thickness planers generally have a limit to the amount of material that should be removed in one pass, for a given type of cutting blade, motor size, etc. of a machine, and the material and the width of the workpiece. Manufacturers therefore often recommend a maximum depth of cut per planing operation. For example, a maximum depth of cut of ⅛ inch may be recommended for a six-inch wide wooden workpiece processed with a thickness planer. Therefore, there is a need to determine quickly and accurately the depth of cut without having to continually stop and manually measure the workpiece.

Various attempts have been made to automatically determine the depth of cut of a workpiece entering a thickness planer. For example, U.S. Pat. No. 5,927,357 to Welsh et al. discloses a workpiece indicator portion which is resiliently displaced by the entering workpiece. The resiliently displaced portion then deflects a pointer which moves along a scale mounted on the housing.

However, with this system, the repeated deflections of the resiliently displaced workpiece-engaging portion produces inaccurate results over time. Also, as this system relies upon the bending of the workpiece-engaging portion instead of a more positive-contact arrangement, inaccuracies result. Further, by having the scale mounted on the housing instead of the carriage itself, inaccuracies may result.

Often when planing wood, it is desired to produce workpieces of standard thicknesses, such as ⅛ inch, ¼ inch, ½ inch, etc. It is therefore desirable to have predetermined stops provided with a thickness planer to stop the carriage at a given height, thus producing finished product of standard thickness.

Various attempts have been made to produce predetermined stops for thickness planers. For example, U.S. Pat. No. 5,927,357 to Welsh et al. discloses a depth stop having three screws of varying heights attached to a rotatable main body. A portion of the main body resides directly below the carriage while the remainder of the main body resides outside of the travel area of the carriage. The height of the pin extending from the portion of the main body residing under the carriage therefore determines the height at which the carriage stops. By rotating the main body, one of three screws of different heights will determine the height of the carriage.

However, it is difficult to quickly and accurately determine at what height the screws are set, i.e. it is not an easy task to set the carriage height to produce a ¾ inch finished workpiece without performing a calibration process. Further, once one of the screws were set to produce the ¾ inch finished workpiece, one twist of that screw will de-calibrate the settings, requiring an operator to repeat the calibration process.

Thus, it is desirable to produce a thickness planer which can be more quickly, more easily, and more accurately set to produce predetermined thicknesses of workpieces than is available in the prior art. For the foregoing reasons, there is a need for a carriage locking mechanism that is capable of quickly and securely fixing the carriage at a given location above the base. Further, there is a need for an accurate depth of cut indicator. Finally, there is a need for a predetermined stop apparatus to allow an operator to quickly, yet accurately, set the carriage at predetermined heights. The claimed invention is directed at overcoming, or at least minimizing, disadvantages of the prior art.

SUMMARY OF THE INVENTION

The invention relates to a thickness planer. In some embodiments, the thickness planer employs a carriage lock mechanism to securely lock the carriage, and thus the cutting head, at a given height above the base. In some embodiments, advantages such as the use of a threaded arrangement and free-floating, non-deflectable shoes, produce mechanical advantages and a secure lock superior to other mechanism currently known. This secure lock reduces carriage vibration and movement and minimizes snipe produced in a workpiece.

In other embodiments, a depth of cut indicator is provided which quickly and accurately determines the thickness of the material about to be removed in the planing operation. Because the depth of cut indicator does not have a resiliently deflectable member contacting the workpiece, this depth of cut indicator is more reliable over time than prior art systems. In some embodiments, the depth of cut indicator includes a rack and pinion arrangement to improve the accuracy of the unit: i.e. movement of the rod contacting the workpiece causes a corresponding movement of a pointer thus resulting in a more accurate reading than systems which rely on deflection. Further, the location and geometries of the depth of cut indicator provide more accurate and easy-to-read results that prior art systems.

In some embodiments, an apparatus having multiple predetermined stops for thickness planers is described. The systems is easy to use and includes a scale by which a user may utilize a given stop. Some embodiments include stops of given standard values, each stop keeping its original carriage height setting such that the apparatus will not require re-calibration because of a turn of a screw.

In some embodiments, a depth of cut indicator for use with a thickness planer is described, the thickness planer having a base and a carriage with a cutting head to remove material from a workpiece, the carriage being displaceable from said base at a defined distance by at least two support columns, the workpiece passing above a work area on the base and contacting the cutting head on the carriage to remove a layer of the workpiece, the depth of cut indicator comprising a pointer housing fixedly attached to said carriage, said pointer housing having a scale to indicate a depth of the material removed, a pointer pivotally mounted within said housing, said pointer having a pointing indicator and a spur, an elevating pointer rod movably attached to said pointer housing, said elevating pointer rod having an end to contact the workpiece and at least one ring, said ring on the elevating pointer rod being connected to the spur on said pointer such that as the carriage is lowered and the end of the elevating pointer rod contacts the workpiece, the pointer rotates to align the pointing indicator with the scale on the pointer housing to correspond to the amount of material being removed by the thickness planer. In some aspects, the pointer rod is chamfered. In some aspects, the depth of cut indicator has a coil spring.

In another embodiment of the present invention, a carriage lock is described for use with a thickness planer, the thickness planer having a base and a carriage with a cutting head to remove material from a workpiece, the carriage being displaceable from is said base at a defined distance by at least two support columns, the workpiece passing above a work area on the base and contacting the cutting head on the carriage to remove a layer of the workpiece, the carriage lock comprising at least two shoes, each shoe located in the carriage and being adjacent one of the support columns, a sleeve having a threaded end and a second end, a right plate lock having at least one foot, said right plate lock being functionally associated with the threaded end of the sleeve, a left plate lock having at least one foot, said left plate lock being mounted on the other end of the sleeve, a handle rotatably connected to said threaded end of said sleeve such that rotation of said handle causes the right plate lock to move toward the left plate lock, the feet of the right and left plate locks pressing the at least two shoes thus releasably securing the carriage to the support columns at a height over the base. In some aspects the carriage lock has at least two shoes located in slots on an outside of at least two support column collars, said at least two support column collars attached to the carriage, said at least two support columns being adapted to be received into said at least two support column collars, the rotation of said handle causing the right plate lock to move toward the left plate lock, thus applying pressure upon the at least two shoes on the outside of at least two support column collars, thus releasably securing the support column collars to the support columns to maintain the carriage at a given height over the base during the planing operation. In some aspects a method of locking a carriage of a thickness planer is described.

In other embodiments a predetermined stop mechanism is described for use with a thickness planer, the thickness planer having a base and a carriage with a cutting head, the carriage being displaceable from said base at a defined distance by at least two support columns, the workpiece passing between a work area on the base and the cutting head on the carriage to remove a layer of a workpiece, the predetermined stop mechanism comprising a step block having a first step at a first height and a second step having a second height, the step block being moveably attached to the base, and a step rod attached to the carriage, the step rod contacting the first step to set the carriage at a first predefined distance above the base, the step rod contacting the second step to set the carriage at a second predefined distance above the base. In some aspects the predetermined stop mechanism has a positive stop mechanism, sometimes being a grooved block connected to a perimeter of the base, a first trough of the grooved block releasably securing the step block such that the step rod contacts the first step to set the carriage at a first predefined distance above the base, a second trough of the grooved block releasably securing the step block such that the step rod contacts the second step to set the carriage at the second predefined distance above the base.

In some embodiments a thickness planer is described for reducing a thickness of a workpiece, comprising a base having a work area over which the workpiece travels, at least two support columns perpendicularly connected to said base, a carriage having a cutting blade assembly, the carriage being movably attached to said two support columns thus raising said carriage a distance over said base, the cutting blade assembly adapted to cut the workpiece as it passes between the work area on the base and the carriage, and a carriage lock to lock said carriage at the distance above the base, the carriage lock having at least two shoes, each shoe located in the carriage and loosely abutting one of the support columns, a sleeve having a threaded end and a second end, a right plate lock having at least one foot, said right plate lock being functionally associated with the threaded end of the sleeve, a left plate lock having at least one foot, said left plate lock being mounted on the other end of the sleeve, a handle rotatably connected to said threaded end of said sleeve such that rotation of said handle causes the right plate lock to move toward the left plate lock, the feet of the right and left plate locks pressing the at least two shoes thus releasably securing the carriage to the support columns at a height over the base.

In some aspects, the thickness planer further comprises a depth of cut indicator having, a pointer housing fixedly attached to said carriage, said pointer housing having a scale to indicate a depth of the material removed, a pointer pivotally mounted within said housing, said pointer having a pointing indicator and a spur, an elevating pointer rod movably attached to said pointer housing, said elevating pointer rod having an end to contact the workpiece and at least one ring, said ring on the elevating pointer rod being connected to the spur on said pointer such that as the carriage is lowered and the end of the elevating pointer rod contacts the workpiece, the pointer rotates to align the pointing indicator with the scale on the pointer housing to correspond to the amount of material being removed by the thickness planer. In some aspects, the thickness planer further comprises a predetermined stop mechanism having a step block having a first step at a first height and a second step having a second height, the step block being moveably attached to the base, and a step rod attached to the carriage, the step rod contacting the first step to set the carriage at a first predefined distance above the base, the step rod contacting the second step to set the carriage at a second predefined distance above the base.

In other embodiments, a carriage lock for use with a thickness planer is described, the thickness planer having a base and a carriage with a cutting head to remove material from a workpiece, the carriage being displaceable from said base at a defined distance by at least two support columns, the workpiece passing above a work area on the base and contacting the cutting head on the carriage to remove a layer of the workpiece, the carriage lock comprising at least two locking rods, each rod adapted to be received within the carriage adjacent one of the support columns, each rod having an inside end and an outside end, a double cam being adapted to be received within the carriage and being adjacent said inside ends of said at least two locking rods, and a lever to control the rotation of the cam, such that by moving the lever, the double cam is rotated to contact the inside ends of the at least two locking rods, the outside ends of said at least two locking rods contacting said support columns, securing the carriage.

Figure 1:
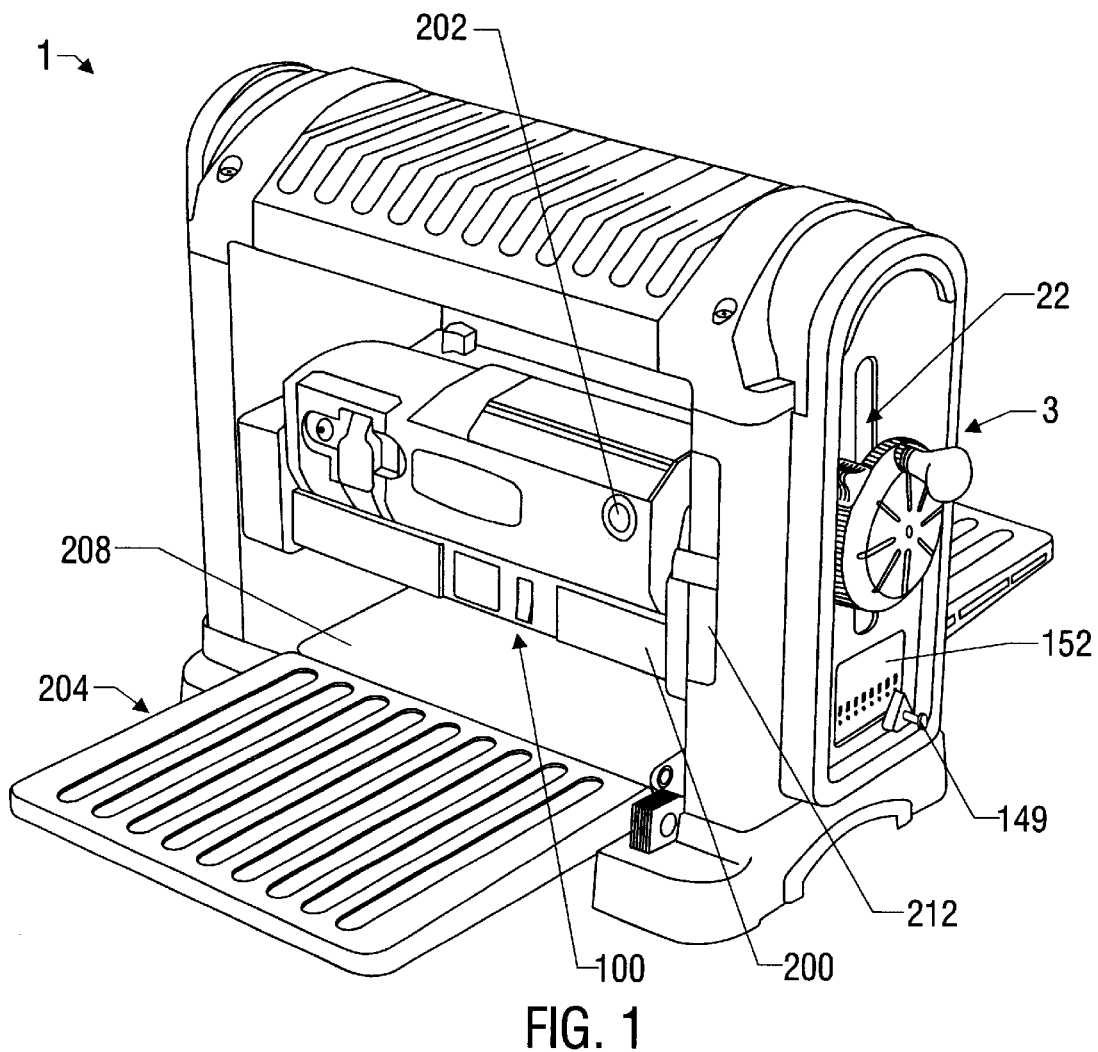
FIG. 1 is a front view of a thickness planer showing components of the claimed invention.

While the invention is susceptible to various modifications and alternative forms, specific embodiments have been shown by way of example in the drawings and will be described in detail herein. However, it should be understood that the invention is not intended to be limited to the particular forms disclosed. Rather, the intention is to cover all modifications, equivalents and alternatives falling within the spirit and scope of the invention as defined by the appended claims.

DESCRIPTION OF ILLUSTRATIVE EMBODIMENTS

The invention relates to an apparatus for planing a workpiece to a given thickness. In some embodiments, the carriage lock of this invention helps to minimize snipe, carriage vibration, and carriage movement by locking the cutter head on the carriage in a secure position. Snipe is a change in the thickness at either end of the planed board caused by an uneven force on the cutter head which most often occurs when a workpiece is entering or leaving the planer. By securely locking the carriage in place, movement and vibration of the carriage are minimized.

Illustrative embodiments of the invention are described below as they might be employed in the planing of a workpiece. In the interest of clarity, not all features of an actual implementation are described in this specification. It will of course be appreciated that in the development of any such actual embodiment, numerous implementation-specific decisions must be made to achieve the developers' specific goals which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments of the invention will become apparent from consideration of the following description and drawings.

Figure 4:
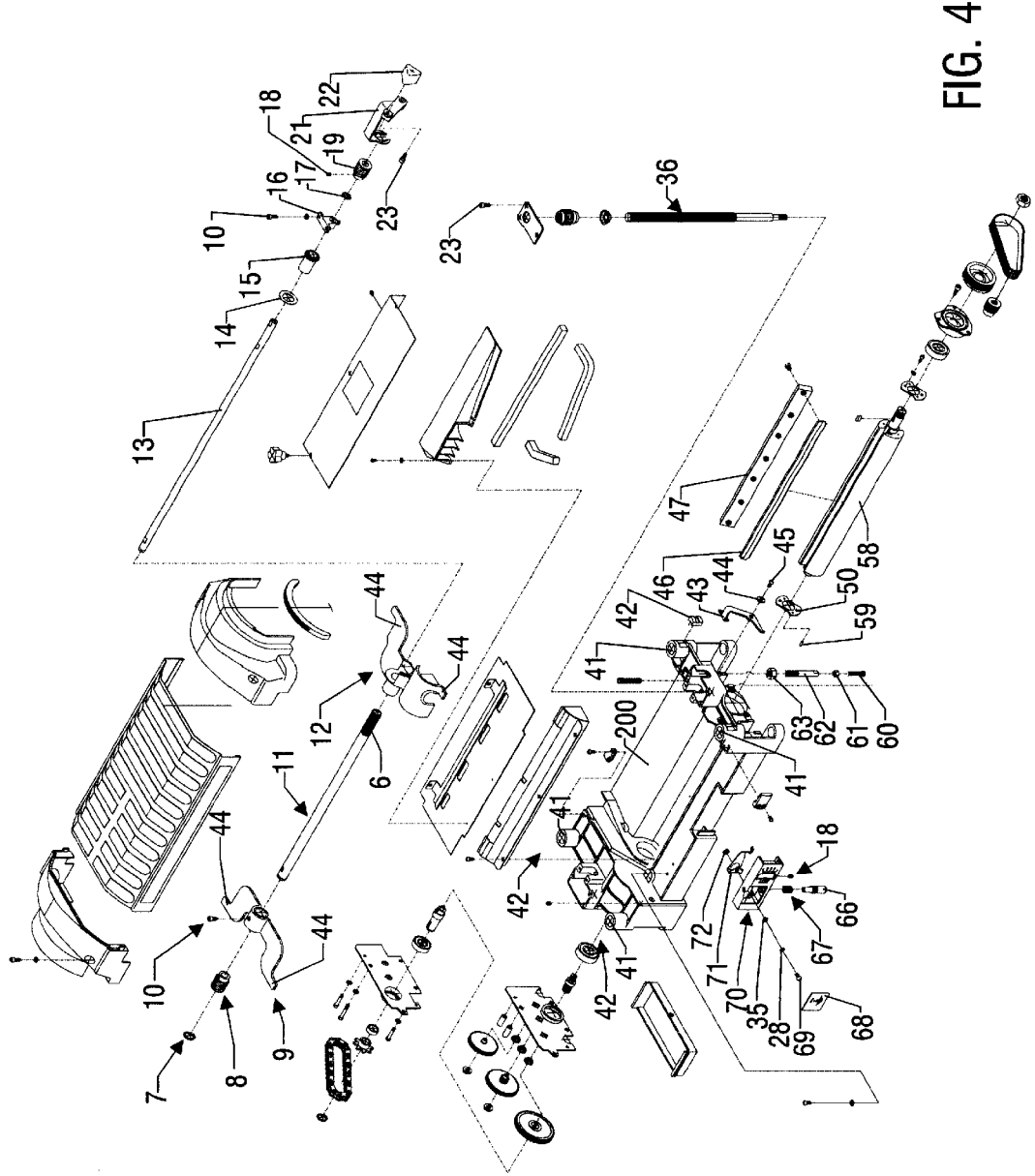
FIG. 4 is an exploded view of one embodiment of the current invention.
Figure 5:
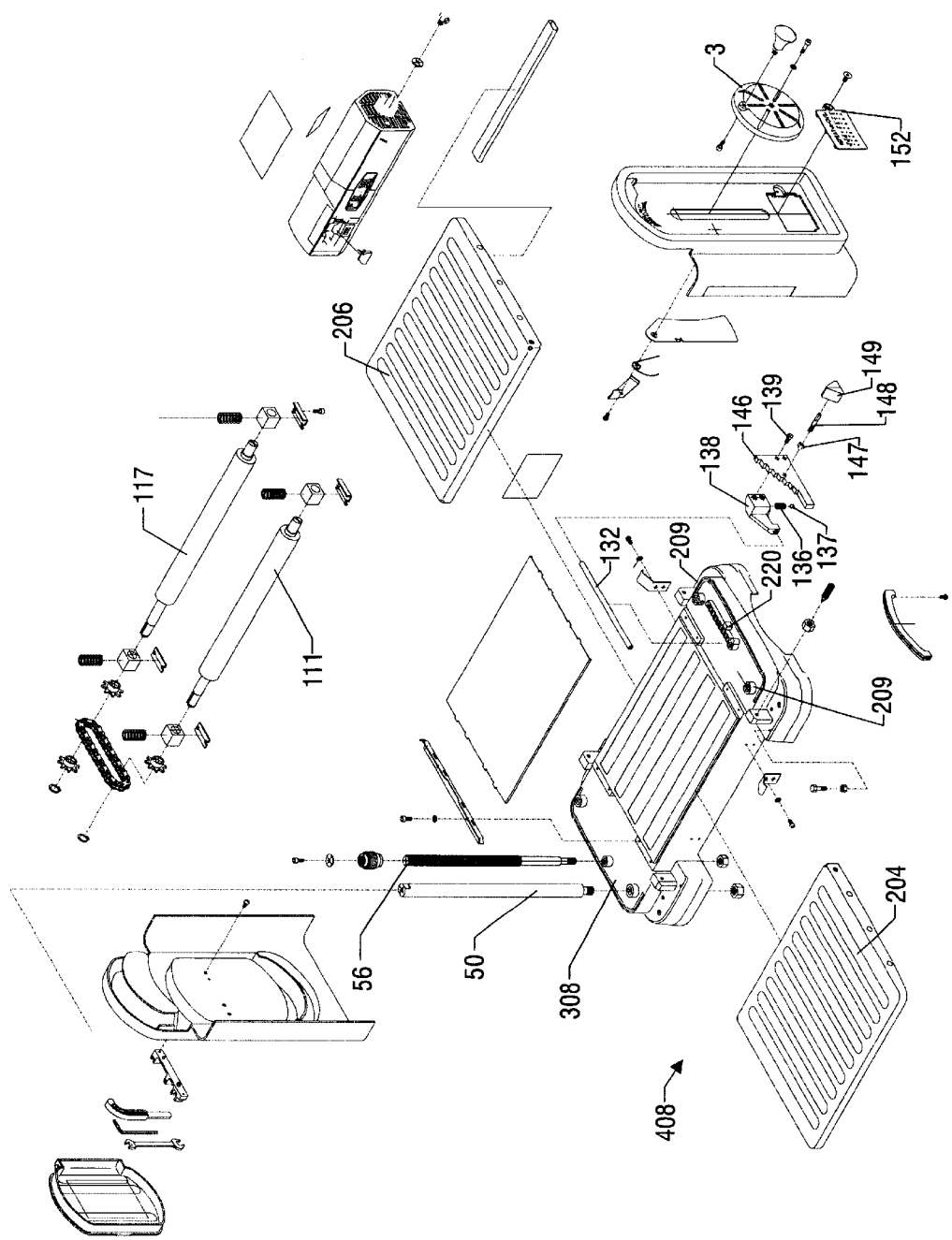
FIG. 5 shows the remainder of the components of the embodiment of the invention shown in FIG. 4.

Embodiments of the invention will now be described with reference to the accompanying figures. Referring to FIGS. 1, 4, and 5, thickness planer 1 is shown to be generally comprised of work area 208 of base 408 upon which four support columns 50 are perpendicularly attached. Base 408 comprises work area 208 and perimeter 308. Carriage 200 is mounted on support columns 50 via support column collars 41. Motor 202, which is used to rotate cutting head 58 having at least one cutting blade 46, is mounted on carriage 200. Left and right lead screws 56 and 36 are perpendicularly mounted to perimeter of base 408 and threadably connected to carriage 200.

Thickness planer 1 contains infeed table 204 upon which a workpiece may be placed when inserting it into thickness planer 1. As will be described in detail elsewhere, rotation of elevation handwheel 3 causes carriage 200 to move relative to base 208 thereby accommodating different thicknesses of workpieces and setting different depths of cut.

Carriage lock knob 22, as will be described more fully herein, may be used to secure carriage 200 at a given height. Depth of cut indicator 100 is capable of readily displaying the thickness of material about to be removed from the workpiece by the planing operation, as will be described herein. Finally, step scale 152 and step knob 149 may be used to set carriage 200 at predetermined stops to produce workpieces of standard thicknesses.

Figure 2:
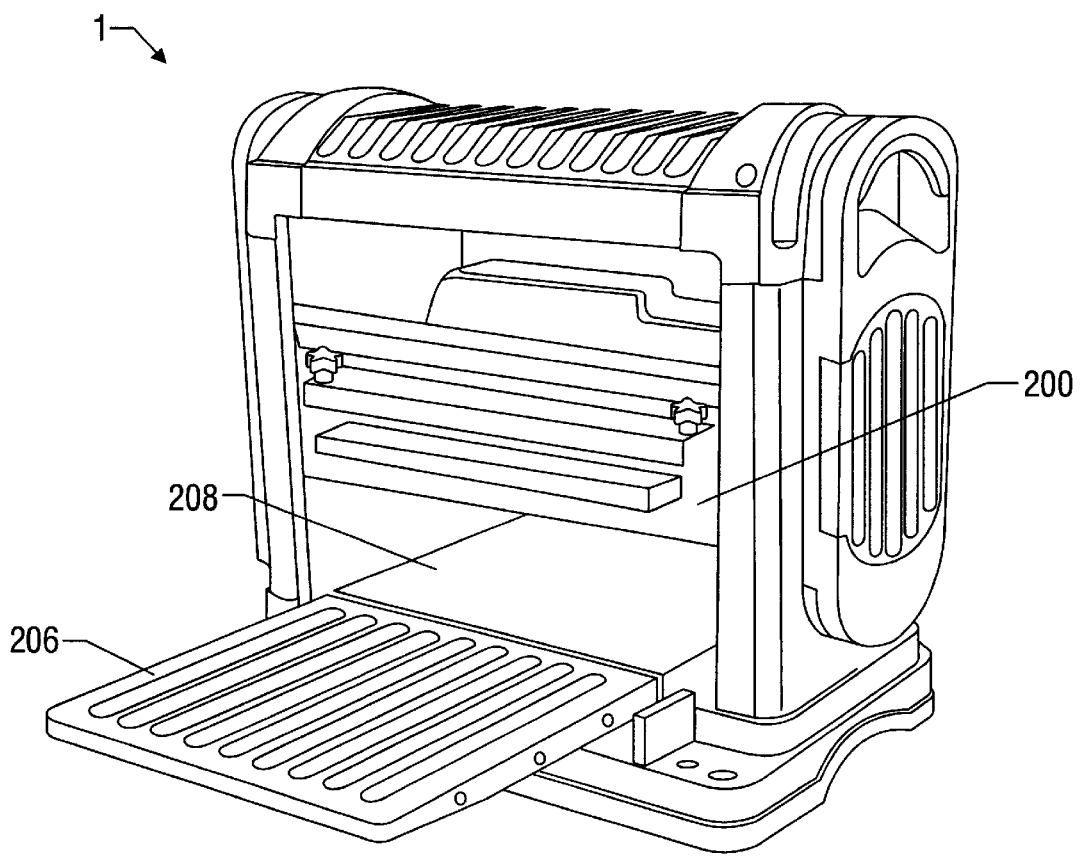
FIG. 2 is a rear view of the embodiment of the planer shown in FIG. 1.
Figure 3:
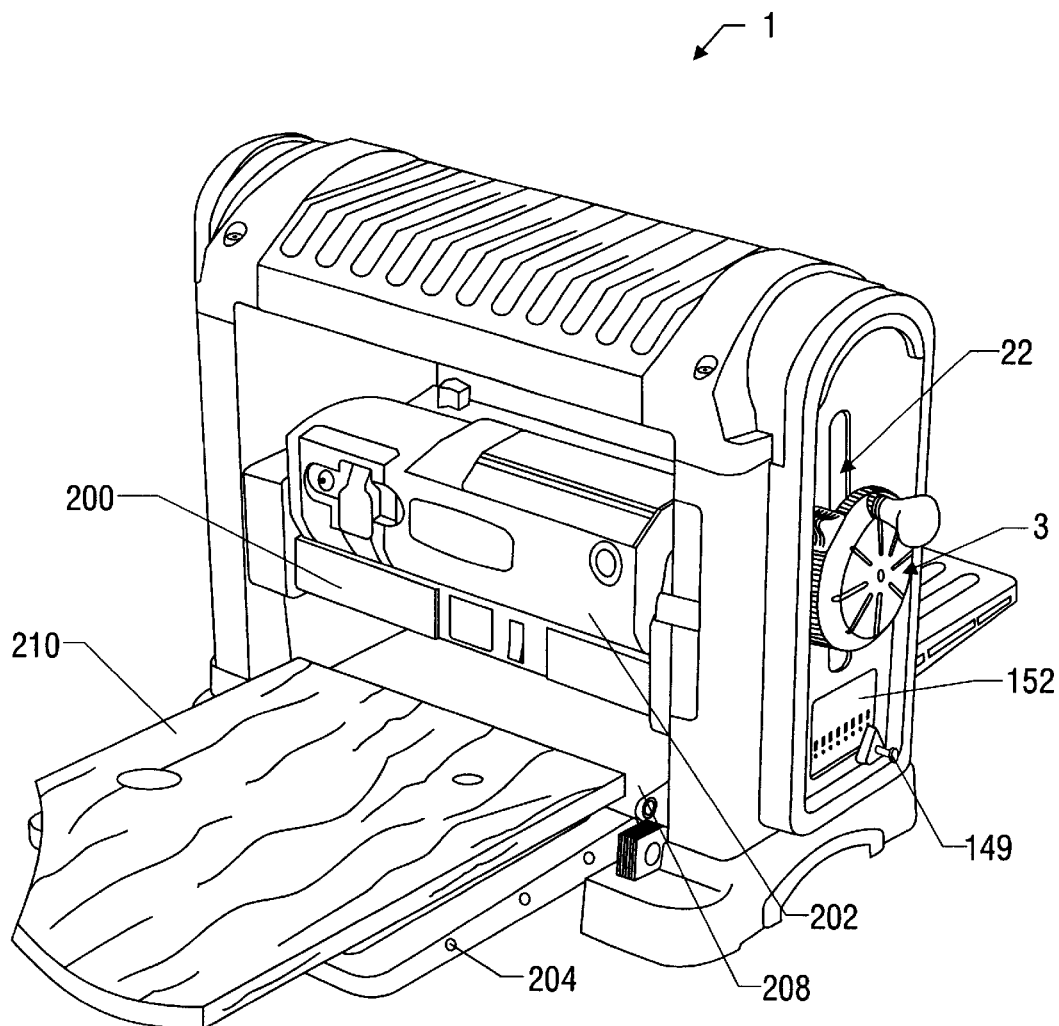
FIG. 3 shows the thickness planer of FIG. 1 having a workpiece.

Referring now to FIG. 2, the rear view of the exemplary thickness planer 1 having an outfeed table 206. FIG. 3 shows workpiece 210 entering planer 1.

Now referring to FIG. 4, an illustrated parts breakdown is shown for various components of thickness planer 1. All components of an embodiment of carriage lock 300 of the current invention are also shown. Carriage lock 300 is comprised of free floating locking shoes 42 located on the outside of support collars 41. These free floating locking shoes 42 provide smoother operation and a less troublesome means for locking carriage 200 than prior art systems. Support collars 41 are holes located in the four corners of carriage 200, and may be integral with carriage 200. Support columns 50, shown in FIG. 5 and mounted on each of four corners of perimeter 308 of base 408, are inserted into the support collars 41 of carriage 200. Thus, carriage 200 travels up and down support collars 50 to produce workpieces of different desired thicknesses. Carriage 200 is driven by the operator rotating elevation handwheel 3 which, via worm gears, raises and lowers carriage 200 on left lead screw 56 and right lead screw 36.

Mounted on the ends of sleeve 11 are right plate lock 12 and left plate lock 9 attached via screw 10. Right plate lock 12 and left plate lock 9 each have two feet 44. Sleeve 11 contains thread 6 on the right end. Retaining ring 7 attaches left worm gear 8 onto transmission shaft 13 which is adapted to be received through sleeve 11. On the right end of transmission shaft 13 is washer 14 held in place with lock nut 15. Transmission shaft 13 is attached to carriage 200 via hex screws 10 inserted into bracket 16. Bracket 16 and hex screws 10 (not shown) also attach the left hand side of transmission shaft 13 to carriage 200.

Washer 17 spaces elevation worm gear 19 from lock nut 15. Set screw 18 locks elevation worm gear 19 to transmission shaft 13. The inside of U-shaped handle 21 is attached to the ratcheted end of lock nut 15, with the other end of lock nut 15 being connected to threads 6 on sleeve 11, thereby holding right plate lock 12 in position. Carriage lock knob 22 is attached to the outside of the U-shaped handle 21 via hex screw 23. As can be seen in FIG. 1, carriage lock knob 22 is located on the perimeter of elevation handwheel 3.

Once assembled, feet 44 of left plate lock 9 and right plate lock 12 may or may not lightly contact shoes 42 which freely float within support column collar 41. In its unlocked position, freely floating contact shoes 42 do not contact support columns 50 with sufficient force to securely lock carriage 200 in place. Further, carriage lock knob 22 is in the position relative to elevation handwheel 3 as shown in FIG. 1.

Figure 10:
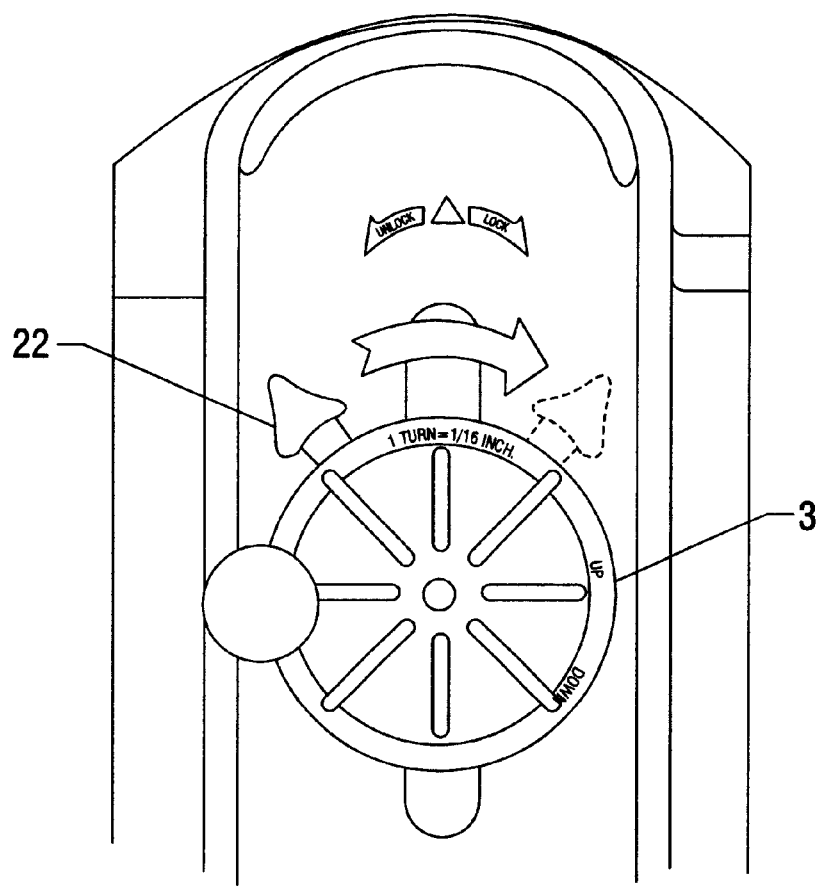
FIG. 10 shows the carriage locking procedure for one embodiment of the present invention.

However, to lock carriage 200 in place at a given elevation along support columns 50, the operator moves carriage lock knob 22 clockwise to the location as shown in FIG. 10. As carriage lock knob 22 is rotated, handle 21 also rotates. As the inside of handle 21 is attached to lock nut 15 which is attached to thread 6 of sleeve 11, the rotation of handle 21 causes right plate lock 12 to move toward left plate lock 9. As plate locks 12 and 9 move toward each other, feet 44 apply pressure on shoes 42. This pressure forces shoes 42 to contact support columns 50 with sufficient force to hold carriage 200 in stable location, thus minimizing snipe and carriage vibration and movement.

To unlock the carriage, carriage lock knob 22 is rotated counterclockwise which allows right plate lock 12 to move away from left plate lock 9, thus releasing the pressure feet 44 apply to shoes 42. In operation, carriage 200 travels along support columns 50 by an operator rotating elevation handwheel 3 with carriage lock 300 in its unlocked position. Generally, shoes 42 are made of any hard metal capable of resisting wear over time, although other material may be used.

Also shown in FIG. 5 are drive rollers 111 and 117 which pull the workpiece into the thickness planer and push the workpiece out of the thickness planer respectively.

Figure 6:
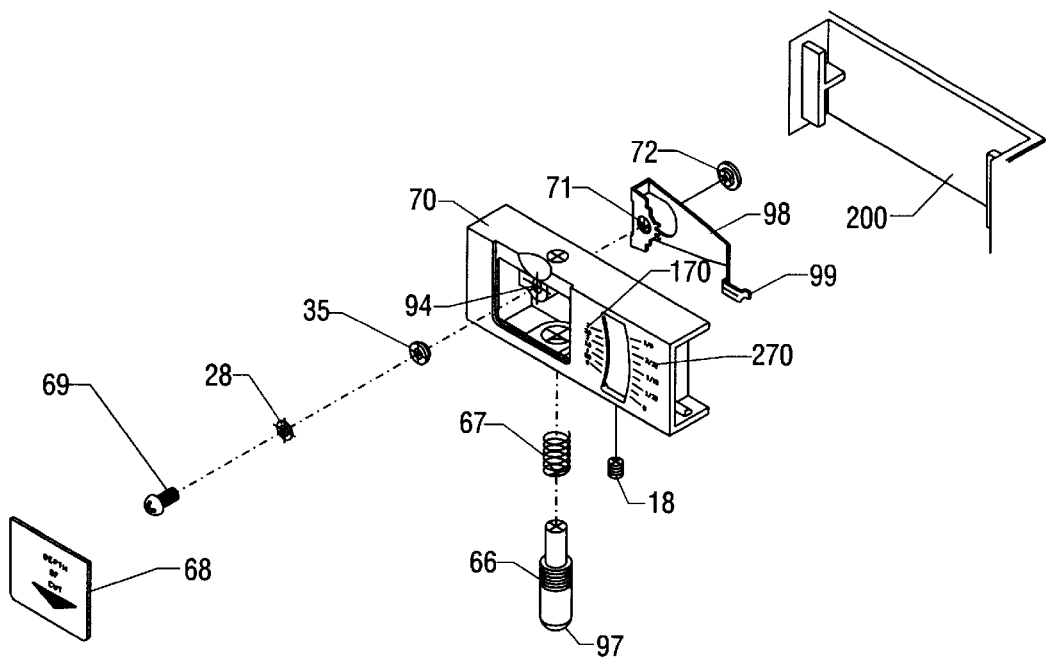
FIG. 6 shows the components of an embodiment of the components of a depth of cut indicator in exploded form.
Figure 7:
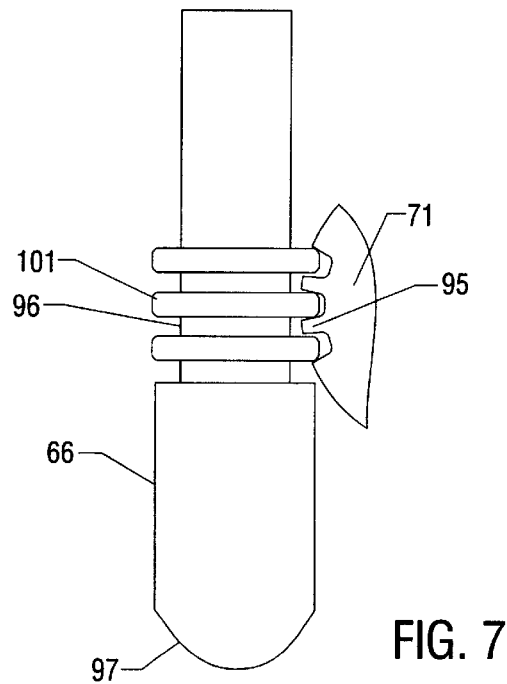
FIG. 7 shows an elevating pointer rod with mating spurs of one embodiment of the present invention.
Figure 8:
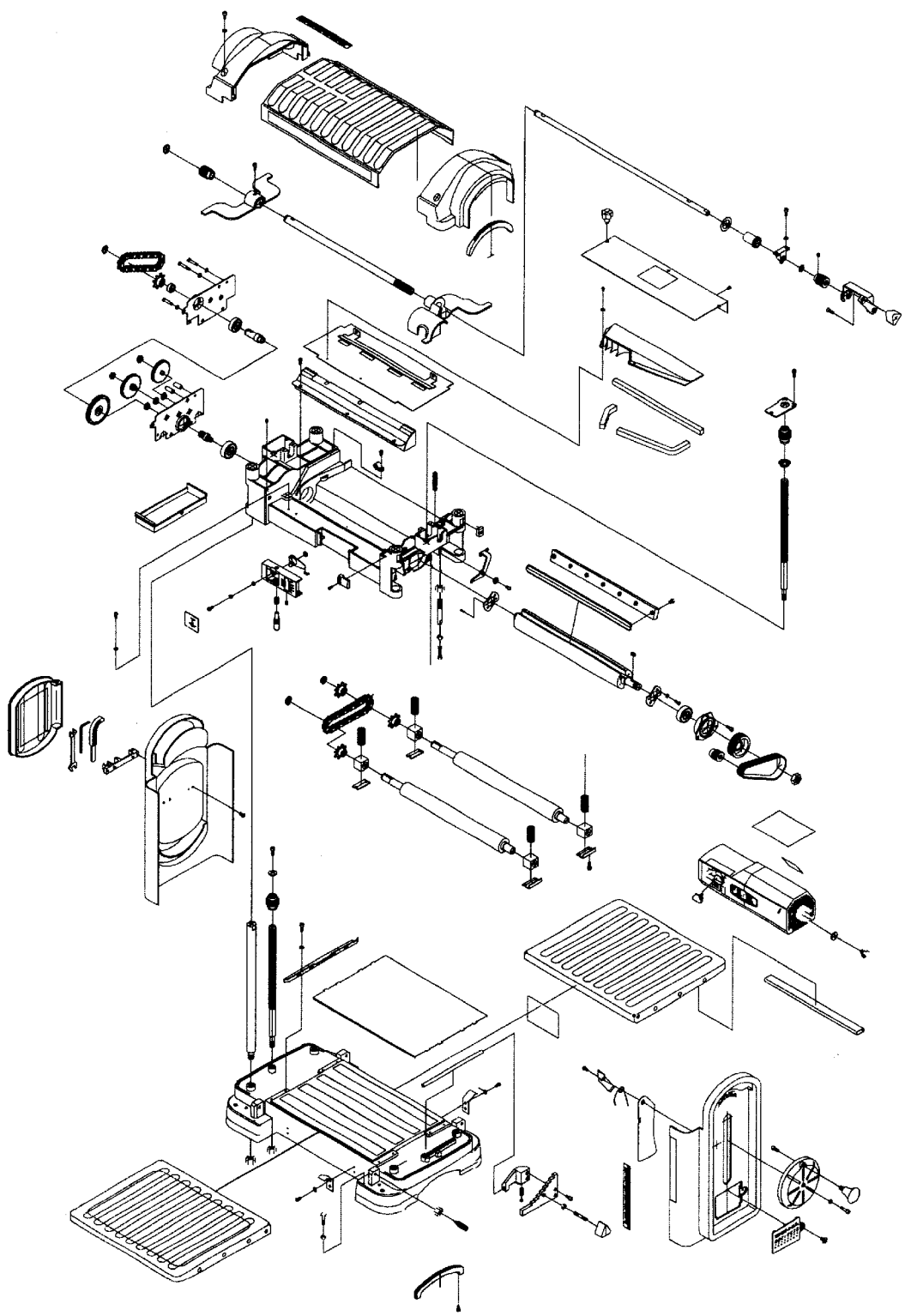
FIG. 8 shows all components of another embodiment of the present invention.
Figure 9:
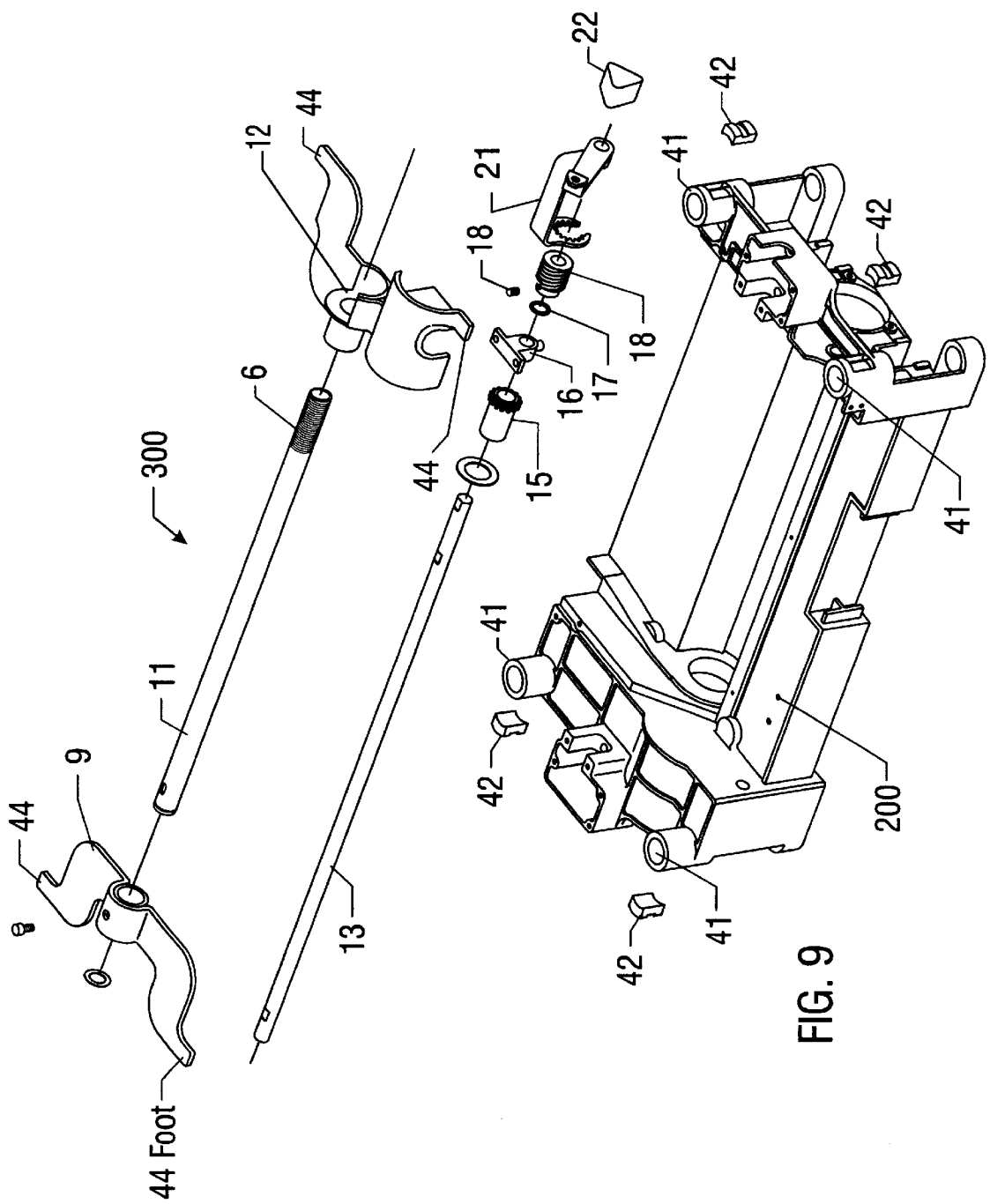
FIG. 9 details the components of one embodiment of the carriage lock of the present invention.

Referring to FIGS. 6 and 7, depth of cut indicator 100 is shown to be comprised of pointer 71 and elevating pointer rod 66 residing in pointer housing 70. Pointer 71 has spurs 95, pointer arm 98, and pointer indicator 99. Pointer housing 70 is rotatably connectable to both pointer 71 and carriage 200 as follows: Screw 69 passes through washer 28 and bushing 35 before being inserted into pointer housing 70. Screw 69 passes through pointer 71 and nut 72 before being inserted into carriage 200 via a tapped hole. Although this configuration is shown, any type of moveable connection could be used.

Elevator pointer rod 66 has chamfer 97 designed to contact a workpiece (not shown). Grooves 96 and rings 101 are circumferentially located along the axis of elevator pointer rod 66. Coil spring 67 circumscribes the upper end of elevating pointer rod 66 which is inserted into pointer housing 70. Coil spring 67 biases elevating pointer rod 66 such that chamfer 97 is at a position farthest away from pointer housing 70. As will be explained, elevating pointer rod 66 is movably secured in pointer housing 70 via contact with spurs 95 on pointer 71.

Also removably attached to the bottom of the pointer housing 70 is set screw 18. Pointer cover 68 is removably attached to the front of pointer housing 70 via a snap fit connection. Metric scale 170 may be inscribed or painted on pointer housing 70, as may be standard scale 270. Because of the geometries of the configuration of the housing and the pointer, the depth indicator readings are magnified thus making small changes in depth move the pointer a greater distance thus making the indicator easier to read.

FIG. 7 shows the interconnection of spurs 95 on pointer 71 with grooves 96 and rings 101 of elevating pointer rod 66. Three rings 101 are shown spaced apart by grooves 96. This clearance allows spurs 95 of pointer 71 to connect to rings 101 of rod 66 in a rack-and-pinion type arrangement. As elevating pointer rod 66 moves up and down, rings 101 drive the teeth or spurs 95 causing pointer 71 to rotate about its axis.

Typically, elevating pointer rod 66 is one to two inches long with a diameter of ¼ inch to ½ inch and made of steel. However, other materials would suffice. Pointer indicator 99 has a substantially horizontal line painted in white or inscribed for easy reading by an operator.

Coil spring 67, along with the force of gravity, assists in maintaining elevating pointer rod 66 in its home position: i.e. a position wherein chamfer 97 of elevating pointer rod 66 is at a position farthest away from pointer housing 70. It should be noted that when pointer rod 66 is in its home position, chamfer 97 is the same height, with respect to base 408, as the lowest point a cutting knife 46 can get to base 408 as it rotates about cutting head 58. This lowest location defines a cutting plane parallel with the base. Thus, pointer indicator 99 aligns with the indicia on both metric scale 170 and standard scale 270.

If this is not the case, pointer 71 may be adjusted in three ways. First, rough adjustment may be made by placing a tooth of spur 95 of pointer 71 in a different groove of elevating pointer rod 66. In this way, adjustments approximately equal to the pitch of rings 101 of elevating pointer rod 66 may be made. Second, slot 94 in pointer housing 70 may be used to adjust the positioning of pointer housing 70. For example, screw 69 may be loosened and pointer housing 70 moved up or down via slot 94 to a desired location. Screw 69 is then tightened. Third, finer adjustments may be made by rotating set screw 18 within pointer housing 70. For instance, by rotating set screw 18 within pointer housing 70 to drive set screw 18 away from base 208, set screw 18 contacts and then drives pointer arm 98 upward, thus forcing pointer indicator 99 upward. Screw 18 allows the pointer to be zeroed in light of mechanical tolerance stack ups.

In operation, a workpiece is placed on infeed table 204 attached to base 208. Carriage 200 is lowered until chamfer 97 of elevating pointer rod 66 contacts the workpiece. Further lowering carriage 200 provides for relative movement between elevating pointer rod 66 and pointer housing 70: i.e. elevating pointer rod is driven upward overcoming the forces of gravity and coil spring 67. As elevating pointer rod 66 is driven upward and into pointer housing 70, rings 101 also move. Rings 101, being in contact with spurs 95, thus force pointer 71 to rotate about its axis. This rotation of pointer 71 changes the location at which pointer indicator 99 aligns with the scales—metric 170 or standard 270. As the carriage is lowered ⅛ inch, for example, pointer indicator 99 displays ⅛ inch. In this way, the depth of cut indicator 100 accurately displays the amount of material which is about to be removed during the planing process.

Figure 11:
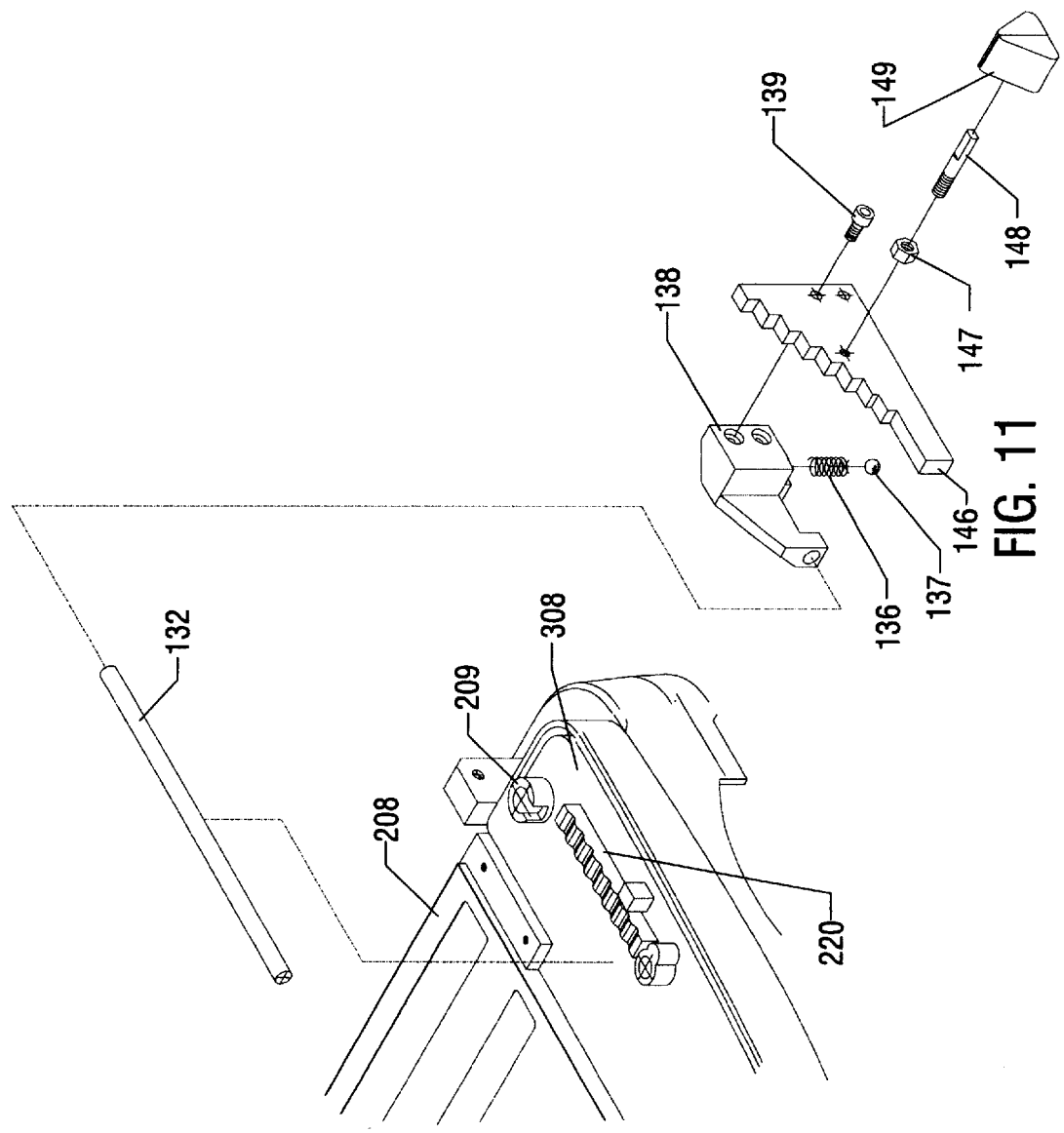
FIG. 11 shows, in exploded form, the components of one embodiment of the present invention having predetermined stops.

Referring to FIG. 11, shown in isolation are components to facilitate performing cuts at given heights, such as ⅛ inch, ¼ inch, ½ inch, ¾ inch, etc. Thus, when it is necessary to routinely perform repetitive planing to preset thicknesses, this repeated step mechanism allows for quick set up of the thickness planer without the need to re-measure the height of the carriage.

Grooved block 220 may be integrally formed to the perimeter of base 308. Grooves, notches, or troughs are formed in grooved block 220 at a given pitch, 0.40 inches for example. Grooved block 220 lies on perimeter of base 308 such that grooved block 220 does not lie directly below carriage 200. By being on the perimeter of base 308, grooved block 220 does not lie in work area 208 of thickness planer 1.

Pivot rod 132 is captured in cast slot in base support column collars 209 by support columns 50 (shown in FIG. 5). Guard block 138 possesses an axial hole by which guard block 138 is mounted on pivot rod 132; i.e. guard block 138 is adapted to receive pivot rod 132. Guard block 138 also contains an axial hole in which coil spring 136 and steel ball 137 are housed.

Figure 12:
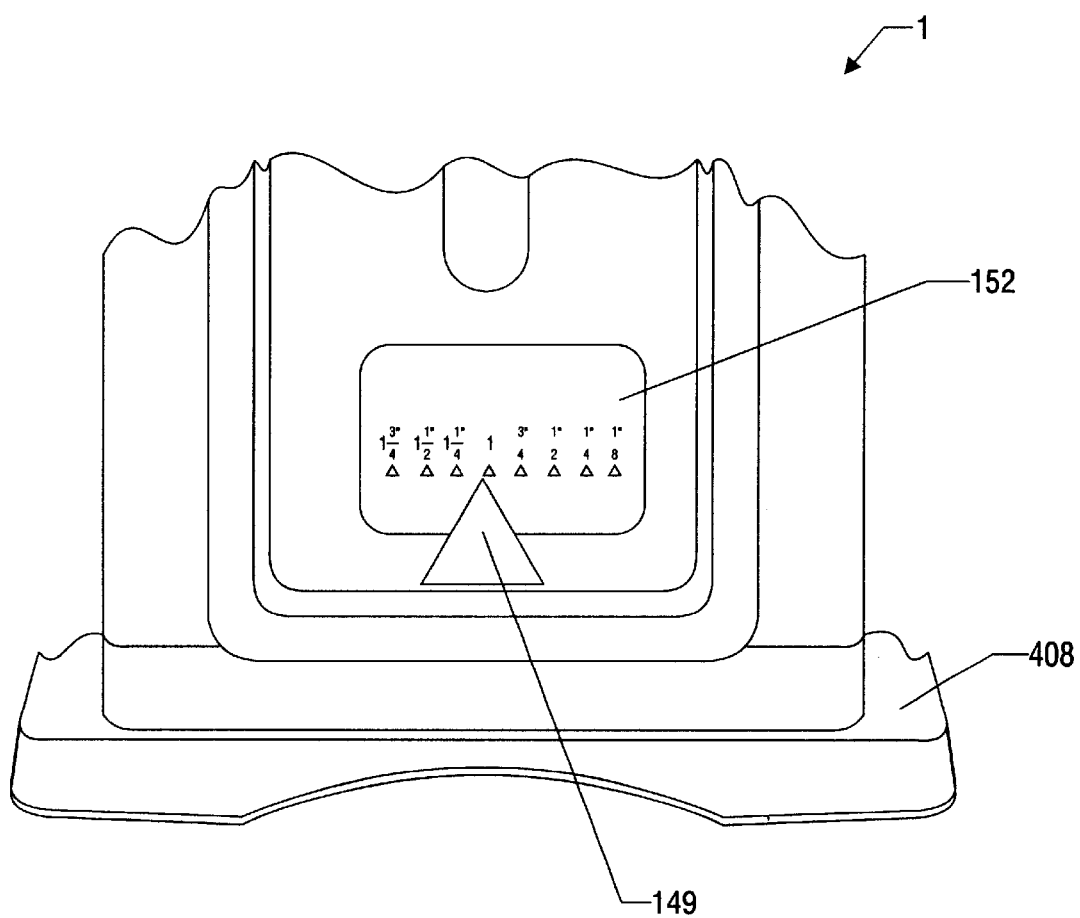
FIG. 12 shows the operation of a stop scale and a stop knob of one embodiment of the present invention.

Attached to guard block 138 by hex screw 139 is step block 146. Step block 146 contains steps which can be of any height. For example, typically steps with an overall height of ⅛ inch, ¼ inch, ½ inch, 3/4 inch, and continuing in ¼ inch increments are used. Attached to step block 146 via hex nut 147 and step block pin 148 is step knob handle 149. Step knob handle 149 has a pointed configuration capable of pointing to an index located on step scale 152 as shown in FIG. 12.

Also part of the repeated step embodiment is step rod 62 shown in FIG. 4. Step rod 62 is threaded on its top end and screwed directly into underside of carriage 200. Nut 63 locks step rod 62 securely into carriage 200. Hex screw 60 is screwed into the lower end of step rod 62 and locked into place by hex nut 61. By screwing or unscrewing hex screw 60, the effective length of step rod 62 may be changed. This provides for adjustment of the step rod 62 length, which accommodates stack up of tolerances. This adjustment mechanism also allows the repeated step embodiment to be set for producing any predetermined stops at any height, not just heights corresponding to the increments on step 146.

In operation, the height of carriage 200 is set in this repeated step embodiment as follows. Step rod 62 including step screw 60 supports carriage 200 at a height away from base 200 by contacting a selected step on step block 146. The lowest step, for example, may correspond to a cutting height of ⅛ inch. Carriage 200 will be lowered until step screw 60 on step rod 62 contacts the first step of step block 146. The thickness planer is designed such that at this point, the cutting plane is ⅛ inch from base 208. Thus a workpiece travelling through the thickness planer will exit being ⅛ inch thick.

In this configuration, the height of step block 146—being mounted to pivot rod 132 via guard block 138—plus the height of step rod 62 including step screw 60 stops the carriage such that the cutting plane is ⅛ inch from base 208.

The repeated step embodiment provides another advantage to the production of multiple workpieces of a given thickness (e.g. one inch). The maximum depth of cut for a commercial planer is generally ⅛ inch. Thus, if a one inch workpiece is desired to be planed from a workpiece over 1½ inches thick but less than 1⅜ inches thick, the operator must run the workpiece through the thickness planer at least four times. Further, the workpiece must be measured periodically to determine its thickness. However, utilizing the repeated step embodiment allows the operator to accurately determine when the desired one inch thickness is achieved. The operator simply sets step knob 149 to correspond to indicia of one inch on step scale 152, and continues to run the workpiece through the planing machine until the step rod 62 contacts a step on step block 146. The thickness of the workpiece then exiting the planer will be the desired one inch. In this way, the operator does not have to constantly measure the workpiece and reset the height of the carriage on the thickness planer.

In its resting state, step block 146 is positioned such that steel ball 137 rests in a groove or trough of grooved block 220. This arrangement provides a positive stop mechanism, although other positive stop arrangements may be utilized.

In this embodiment, to move step knob 149, and thus step block 146, out of its resting position, the operator must exert enough force to overcome the force of coil spring 136 and to overcome the force necessary to drive steel ball 137 out of its groove and over a peak into the next trough on grooved block 220. The trough of the grooves of grooved block 220 are located such that when steel ball 137 is resting in a given trough, step knob 149 corresponds to a given precut setting on step scale 152.

The next step of step block 146 may correspond to a cutting thickness of ¼ inch. To utilize this preset ¼ setting, the operator raises carriage 200. The operator then moves step knob 149 to the left from the ⅛ inch preset thickness stop to the ¼ inch preset thickness stop, as shown on step scale 152 in FIG. 12. This action moves step block 146 to the left until steel ball 137 is seated in the next trough on grooved block 220. The operator then lowers carriage 200 until step rod 62 including step screw 60 contacts step block 146 and locks carriage 200 into position (as previously described). As this step is ⅛ inch taller than the first, carriage 200 is now set such that a workpiece will be planed to a thickness of ¼ inch.

This same procedure may be repeated for any given number of steps so desired. In this way, the thickness planer may be quickly and easily set to produce workpieces of accurate thicknesses.

Figure 13A:
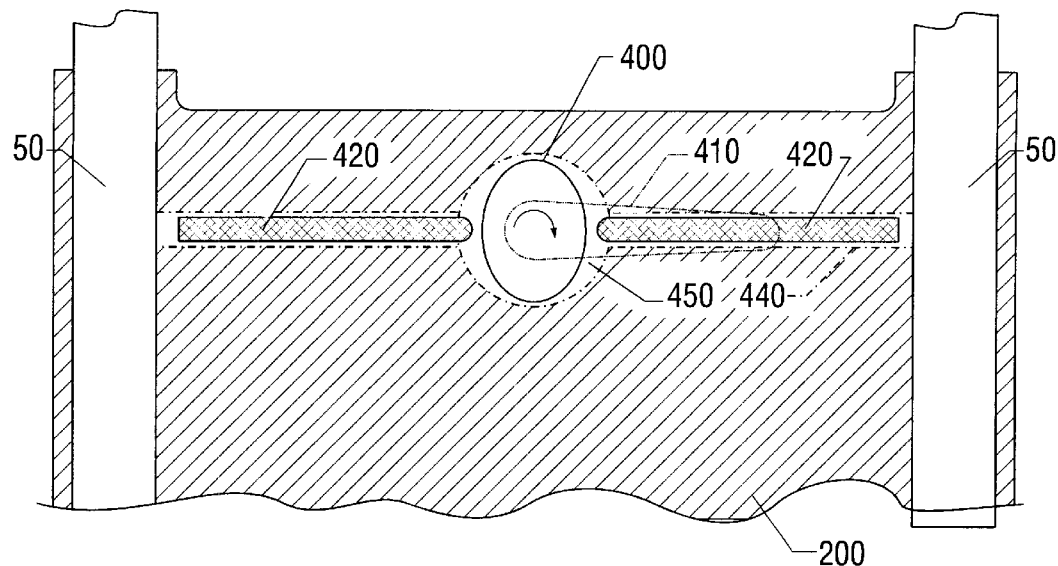
FIG. 13A–D show an alternative embodiment of the carriage locking mechanism.

Now referring to FIGS. 13A–D, an alternative embodiment of a carriage lock is shown to hold carriage assembly 200 securely in place. As shown in FIG. 13A, the carriage lock comprises double cam 400, locking rods 420 and lever 410. In one embodiment, the locking rods are made of brass. In another embodiment, shown in FIGS. 14A–D, the carriage lock further comprises locking shoes 470, which may also be made of brass or other non-deflecting material.

FIG. 13A shows a cross-sectional front view of this embodiment of the carriage lock. Locking rods 420 are housed in rod bore 440 in carriage 200. Double cam 400, housed in cam bore 450 in carriage 200, is shown in its unlocked position. Lever 410 is connected to double cam 400. In the unlocked position, double cam 400 does not exert force on locking rods 420.

Figure 13B:
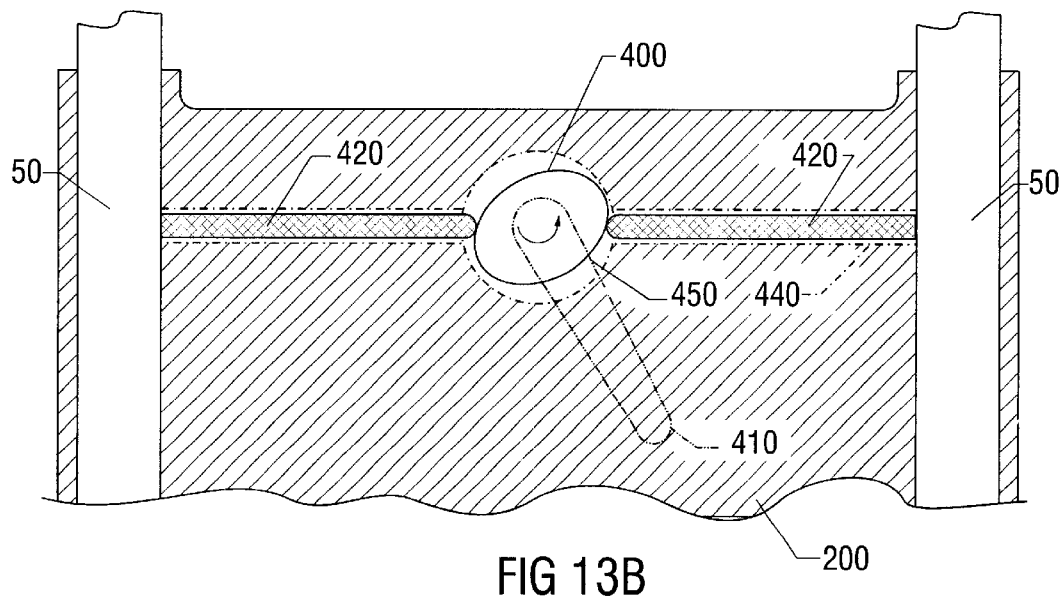

FIG. 13B shows the carriage lock in its locked position. To lock carriage 200 in place, lever 410 is rotated clockwise. This rotation forces double cam 400 to contact the inside ends of locking rods 420. This action forces the outside end of locking rods to contact support columns 50 such that carriage 200 is secured against support columns 50.

Figure 13C:
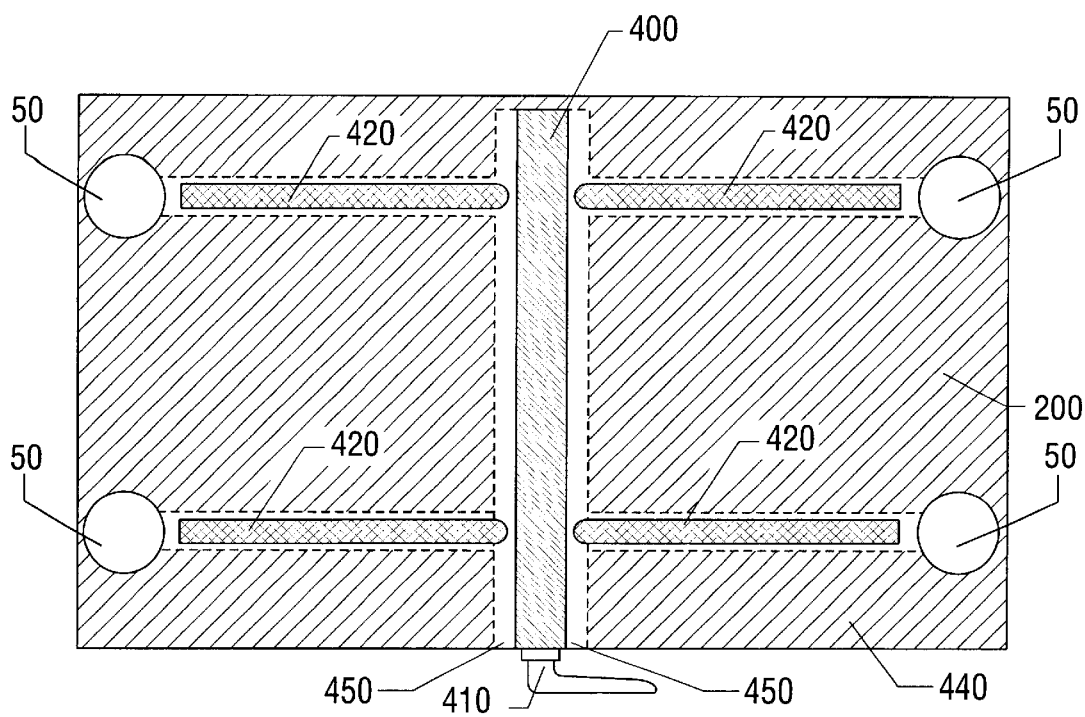
Figure 13D:
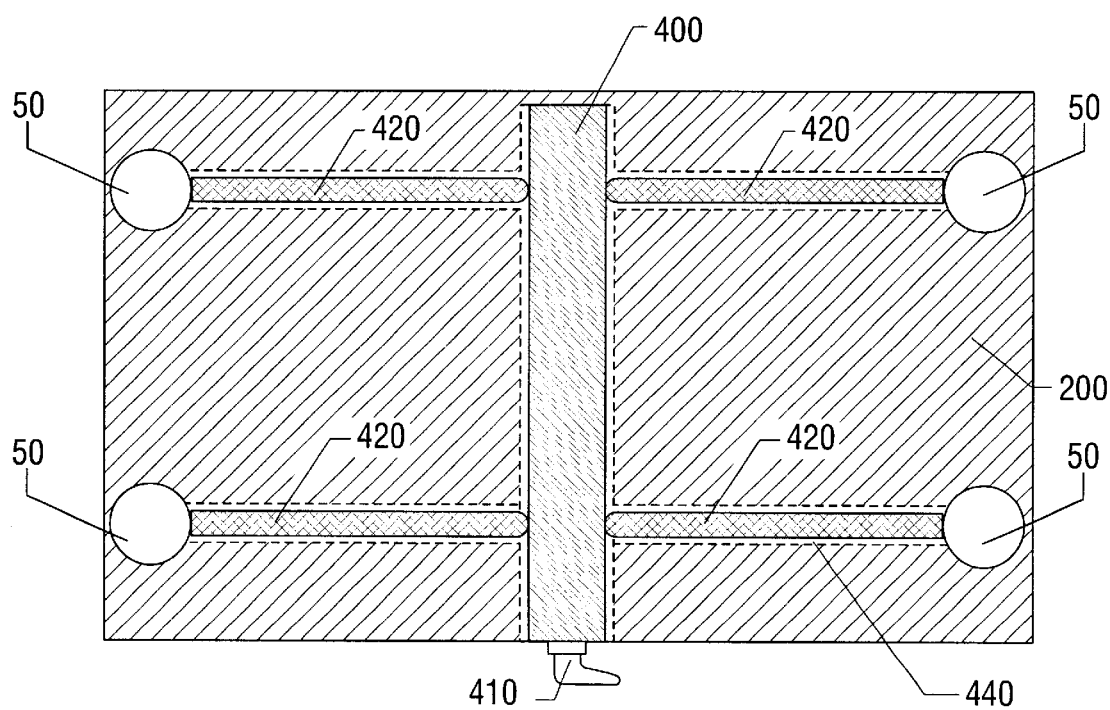

FIG. 13C shows a cross sectional top view of this embodiment of the carriage locking mechanism in the unlocked position, while FIG. 13D shows a cross sectional top view of this embodiment of the carriage locking mechanism in the locked position.

Figure 14A:
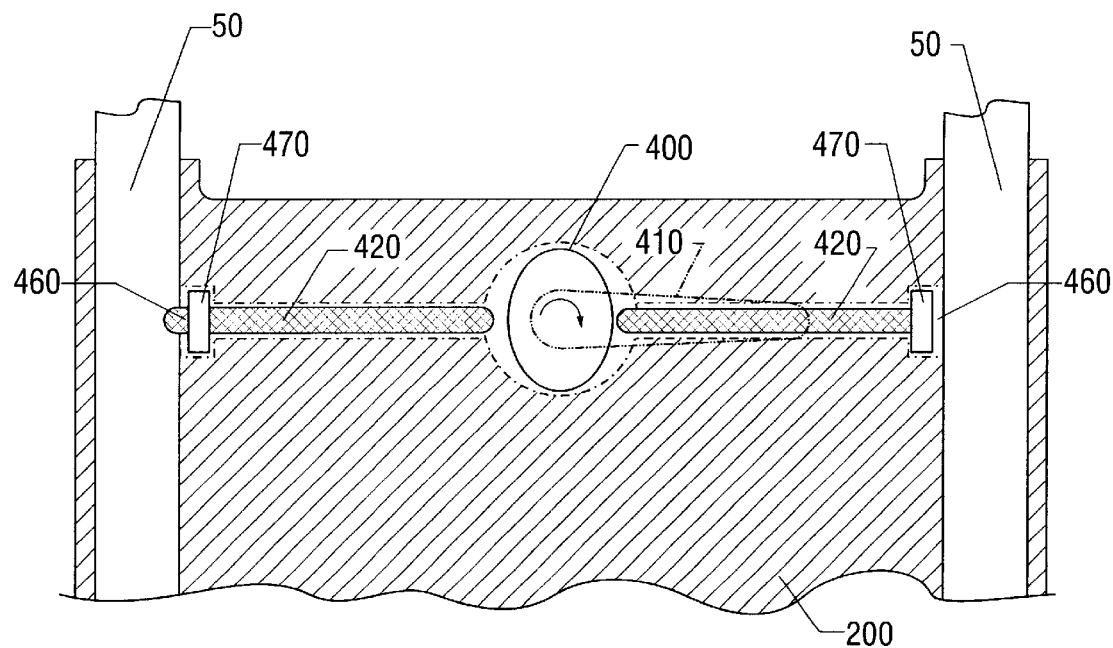
FIGS. 14A–D show an alternative embodiment of a carriage locking mechanism.

Referring to FIGS. 14A–D, another embodiment of the carriage lock mechanism. FIG. 14A shows a cross-sectional front view of this embodiment of the carriage lock. Locking rods 420 are housed in rod bore 440 in carriage 200. Attached to the outside ends of rods 420 are locking shoes 470, which are housed in shoe bore in carriage 200. Double cam 400, housed in cam bore 450 in carriage 200, is shown in its unlocked position. Lever 410 is connected to double cam 400. In the unlocked position, double cam 400 does not exert force on locking rods 420.

Figure 14B:
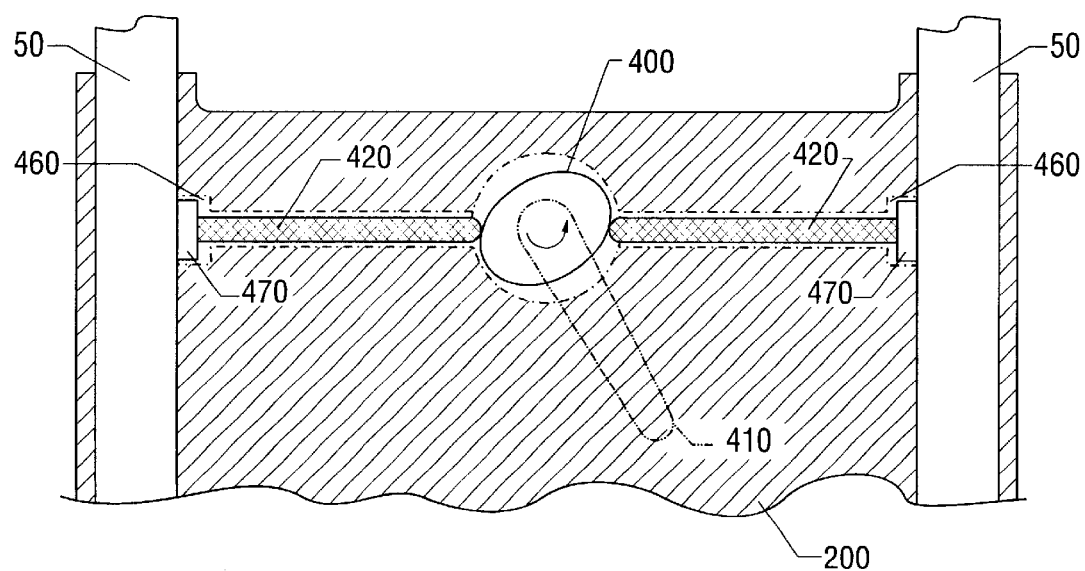

FIG. 14B shows the carriage lock in its locked position. To lock carriage 200 in place, lever 410 is rotated clockwise. This rotation forces double cam 400 to contact the inside ends of locking rods 420. This action forces locking shoes 470 on the outside end of locking rods to contact support columns 50 such that carriage 200 is secured against support columns 50. To unlock carriage assembly 200, lever 410 is rotated counterclockwise.

Figure 14C:
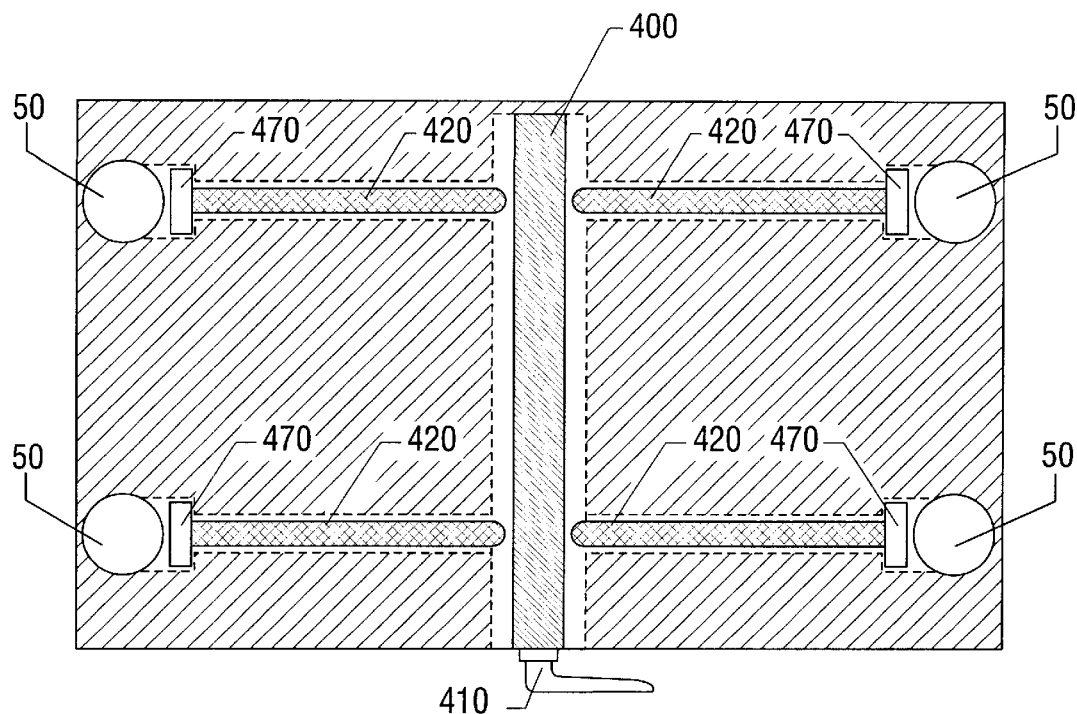
Figure 14D:
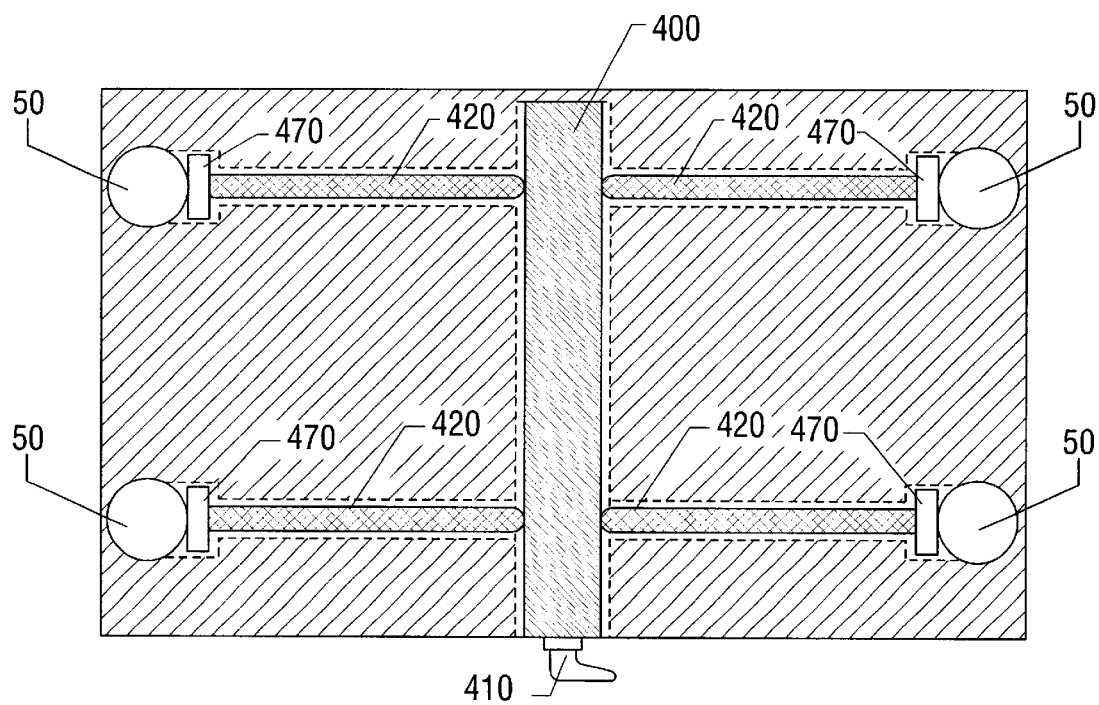

FIG. 14C shows a cross sectional top view of this embodiment of the carriage locking mechanism in the unlocked position, while FIG. 14D shows a cross sectional top view of this embodiment of the carriage locking mechanism in the locked position.

Double cam 400 is oval-shaped and connected to lever 420 that controls its movement. As lever 410 is moved in a clockwise or counter-clockwise direction, double cam 400 moves with it, either toward rods 420 or away from them.

Although various embodiments have been shown and described, the invention is not so limited and will be understood to include all such modifications and variations as would be apparent to one skilled in the art.

The following table lists the description and the numbers as used herein and in the drawings attached hereto.

| Reference Designator | Name |
| --- | --- |
| 1 | Thickness planer |
| 3 | Elevation Handwheel |
| 6 | Thread |
| 7 | Retaining Ring |
| 8 | Left Worm Gear |
| 9 | Left Plate Lock |
| 10 | Hex Screw |
| 11 | Sleeve |
| 12 | Right Plate Lock |
| 13 | Transmission Shaft |
| 14 | Washer |
| 15 | Lock Nut |
| 16 | Bracket |
| 18 | Set Screw |
| 19 | Elevation Worm Gear |
| 22 | Carriage Lock Knob |
| 23 | Hex Screw |
| 28 | Washer |
| 35 | Bushing |
| 36 | Left Lead Screw |
| 41 | Support Column Collar |
| 42 | Shoes |
| 44 | Feet |
| 46 | Cutting Knife |
| 50 | Support Column |
| 56 | Right Lead Screw |
| 58 | Cutting Head |
| 60 | Screw |
| 62 | Step Rod |
| 66 | Elevating Pointer Rod |
| 67 | Coil Spring |
| 68 | Pointer Cover |
| 69 | Screw |
| 70 | Pointer Housing |
| 71 | Pointer |
| 72 | Nut |
| 94 | Slot |
| 95 | Spurs |
| 96 | Rod Grooves |
| 97 | Chamfer |
| 98 | Pointer Arm |
| 99 | Pointer Indicator |
| 100 | Depth of Cut Indicator |
| 101 | Rings |
| 111 | Infeed Drive Roller |
| 117 | Outfeed Drive Roller |
| 132 | Pivot Rod |
| 136 | Coil Spring |
| 137 | Steel Ball |
| 138 | Guard Block |
| 139 | Hex Screw |
| 146 | Step Block |

-continued

| Reference Designator | Name |
| --- | --- |
| 147 | Hex Nut |
| 148 | Step Block Pin |
| 149 | Step Knob |
| 152 | Step Scale |
| 170 | Metric Scale |
| 200 | Carriage |
| 202 | Motor |
| 204 | Infeed Table |
| 206 | Outfeed Table |
| 208 | Work Area on Base |
| 209 | Base Support Column Collar |
| 210 | Workpiece |
| 220 | Grooved Block |
| 270 | Standard Scale |
| 300 | Carriage Lock |
| 308 | Perimeter of Base |
| 400 | Double Cam |
| 408 | Base |
| 410 | Lever |
| 420 | Locking Rod |
| 430 | Locking Shoe |
| 440 | Rod Bore |
| 450 | Cam Bore |
| 460 | Shoe Bore |
| 470 | Locking Shoe |

What is claimed is:

1. A predetermined stop mechanism for use with a thickness planer, the thickness planer having a base and a carriage with a cutting head, the carriage being displaceable from said base at a defined distance by at least two support columns, the workpiece passing between a work area on the base and the cutting head on the carriage to remove a layer of a workpiece, the predetermined stop mechanism comprising:

a step block having a first step at a first height and a second step having a second height, the step block being linearly, moveably attached to the base; and a step rod attached to the carriage, the step rod contacting the first step to set the carriage at a first predefined distance above the base, the step rod contacting the second step to set the carriage at a second predefined distance above the base.

2. The predetermined stop mechanism of claim 1 in which the step block further comprises a positive stop mechanism.

3. The predetermined stop mechanism of claim 2 in which the positive stop mechanism further comprises a grooved block connected to a perimeter of the base, a first trough of the grooved block releasably securing the step block such that the step rod contacts the first step to set the carriage at the first predefined distance above the base, a second trough of the grooved block releasably securing the step block such that the step rod contacts the second step to set the carriage at the second predefined distance above the base.

4. The predetermined stop mechanism of claim 3 further comprising:

a guard block being connected to the step block;

a pivot rod passing through an axis of the guard block, the pivot rod being attached to the perimeter of the base;

a spring being located within the guard block; and a ball contacting the spring, the ball contacting the grooved block such that the ball rests in the first trough of the grooved block when the step rod contacts the first step to set the carriage at the first predefined distance above the base, the ball contacting the grooved block such that the ball rests in the second trough of the grooved block when the step rod contacts the second step to set the carriage at the second predefined distance above the base.

5. The predetermined stop mechanism of claim 4 wherein the ball is a steel ball.

6. The predetermined stop mechanism of claim 1 further comprising:

a step knob being connected to the step block; and a step scale having indicia, the step knob aligning with the indicia corresponding to the first predefined distance when the step rod contacts the first step, the step knob aligning with the indicia corresponding to the second predefined distance when the step rod contacts the second step.

7. The predetermined stop mechanism of claim 3 in which the grooved block is integrally formed with the perimeter of the base.

8. A thickness planer for reducing a thickness of a workpiece, comprising a base having a work area over which the workpiece travels;

at least two support columns perpendicularly connected to said base;

a carriage having a cutting blade assembly, the carriage being movably attached to said two support columns thus raising said carriage a distance over said base, the cutting blade assembly adapted to cut the workpiece as it passes between the work area on the base and the carriage; and a predetermined stop mechanism having a step block having a first step at a first height and a second step having a second height, the step block being linearly, moveably attached to the base, and a step rod attached to the carriage, the step rod contacting the first step to set the carriage at a first predefined distance above the base, the step rod contacting the second step to set the carriage at a second predefined distance above the base.

9. The thickness planer of claim 8 in which the step block further comprises a positive stop mechanism.

10. The thickness planer of claim 9 in which the positive stop mechanism further comprises a grooved block connected on a perimeter of a base, a first trough of the grooved block releasably securing the step block such that the step rod contacts the first step to set the carriage at the first predefined distance above the base, a second trough of the grooved block releasably securing the step block such that the step rod contacts the second step to set the carriage at the second predefined distance above the base.

11. The thickness planer of claim 10 further comprising:

a guard block being connected to the step block;

a pivot rod passing through an axis of the guard block, the pivot rod being attached to the base;

a spring being located within the guard block; and a ball contacting the spring, the ball contacting the grooved block such that the ball rests in the first trough of the grooved block when the step rod contacts the first step to set the carriage at the first predefined distance above the base, the ball contacting the grooved block such that the ball rests in the second trough of the grooved block when the step rod contacts the second step to set the carriage at the second predefined distance above the base.

12. The thickness planer of claim 11 wherein the ball is a steel ball.

13. The thickness planer of claim 8 further comprising:

a step knob being connected to the step block; and a step scale having indicia, the step knob aligning with the indicia corresponding to the first predefined distance when the step rod contacts the first step, the step knob aligning with the indicia corresponding to the second predefined distance when the step rod contacts the second step.

14. The thickness planer of claim 10 in which the grooved block is integrally formed with the perimeter of the base.

15. A predetermined stop mechanism for use with a thickness planer, the thickness planer having a base and a carriage with a cutting head, the carriage being displaceable from said base at a defined distance by at least two support columns, the workpiece passing between a work area on the base and the cutting head on the carriage to remove a layer of a workpiece, the predetermined stop mechanism comprising:
    a step block moveably attached to the base, the step block comprising:
        a first step at a first height;
        a second step having a second height; and
        a positive stop mechanism, having a grooved block connected to a perimeter of the base, the grooved block having first and a second trough; and
    a step rod attached to the carriage, wherein the first trough of the grooved block releasably secures the step block such that the step rod contacts the first step to set the carriage at a first predefined distance above the base, the second trough of the grooved block releasably secures the step block such that the step rod contacts the second step to set the carriage at a second predefined distance above the base.

16. The predetermined stop mechanism of claim 15 in which the grooved block is integrally formed with the perimeter of the base.

17. The predetermined stop mechanism of claim 15 further comprising:
    a step knob being connected to the step block; and
    a step scale having indicia, the step knob aligning with the indicia corresponding to the first predefined distance when the step rod contacts the first step, the step knob aligning with the indicia corresponding to the second predefined distance when the step rod contacts the second step.

18. The predetermined stop mechanism of claim 15 further comprising:
    a guard block being connected to the step block;
    a pivot rod passing through an axis of the guard block, the pivot rod being attached to the perimeter of the base;
    a spring being located within the guard block; and
    a ball contacting the spring, the ball contacting the grooved block such that the ball rests in the first trough of the grooved block when the step rod contacts the first step to set the carriage at the first predefined distance above the base, the ball contacting the grooved block such that the ball rests in the second trough of the grooved block when the step rod contacts the second step to set the carriage at the second predefined distance above the base.

19. The predetermined stop mechanism of claim 18 wherein the ball is a steel ball.

20. A thickness planer for reducing a thickness of a workpiece, comprising
    a base having a work area over which the workpiece travels;
    at least two support columns perpendicularly connected to said base;
    a carriage having a cutting blade assembly, the carriage being movably attached to said two support columns thus raising said carriage a distance over said base, the cutting blade assembly adapted to cut the workpiece as it passes between the work area on the base and the carriage; and
    a predetermined stop mechanism comprising:
        a step block moveably attached to the base, the step block comprising:
            a first step at a first height;
            a second step having a second height; and
            a positive stop mechanism, having a grooved block connected on a perimeter of a base, the grooved block having a first and a second trough; and
        a step rod attached to the carriage, wherein the first trough of the grooved block releasably secures the step block such that the step rod contacts the first step to set the carriage at a first predefined distance above the base, the second trough of the grooved block releasably secures the step block such that the step rod contacts the second step to set the carriage at the second predefined distance above the base.

21. The thickness planer of claim 20 further comprising:
    a guard block being connected to the step block;
    a pivot rod passing through an axis of the guard block, the pivot rod being attached to the base;
    a spring being located within the guard block; and
    a ball contacting the spring, the ball contacting the grooved block such that the ball rests in the first trough of the grooved block when the step rod contacts the first step to set the carriage at the first predefined distance above the base, the ball contacting the grooved block such that the ball rests in the second trough of the grooved block when the step rod contacts the second step to set the carriage at the second predefined distance above the base.

22. The thickness planer of claim 21 wherein the ball is a steel ball.

23. The thickness planer of claim 20 further comprising:
    a step knob being connected to the step block; and
    a step scale having indicia, the step knob aligning with the indicia corresponding to the first predefined distance when the step rod contacts the first step, the step knob aligning with the indicia corresponding to the second predefined distance when the step rod contacts the second step.

24. The thickness planer of claim 20 in which the grooved block is integrally formed with the perimeter of the base.

25. A predetermined stop mechanism for use with a thickness planer, the thickness planer having a base and a carriage with a cutting head, the carriage being displaceable from said base at a defined distance by at least two support columns, the workpiece passing between a work area on the base and the cutting head on the carriage to remove a layer of a workpiece, the predetermined stop mechanism comprising:
    a step block having a first step at a first height and a second step having a second height, the step block being moveably attached to the base;
    a step rod attached to the carriage, the step rod contacting the first step to set the carriage at a first predefined distance above the base, the step rod contacting the second step to set the carriage at a second predefined distance above the base;
    a step knob being connected to the step block; and a step scale having indicia, the step knob aligning with the indicia corresponding to the first predefined distance when the step rod contacts the first step, the step knob aligning with the indicia corresponding to the second predefined distance when the step rod contacts the second step.

26. The predetermined stop mechanism of claim 25 in which the step block further comprises a positive stop mechanism.

27. A thickness planer for reducing a thickness of a workpiece, comprising:

a base having a work area over which the workpiece travels;

at least two support columns perpendicularly connected to said base;

a carriage having a cutting blade assembly, the carriage being movably attached to said two support columns thus raising said carriage a distance over said base, the cutting blade assembly adapted to cut the workpiece as it passes between the work area on the base and the carriage;

a predetermined stop mechanism comprising:

a step block having a first step at a first height and a second step having a second height, the step block being moveably attached to the base; and a step rod attached to the carriage, the step rod contacting the first step to set the carriage at a first predefined distance above the base, the step rod contacting the second step to set the carriage at a second predefined distance above the base;

a step knob being connected to the step block; and a step scale having indicia, the step knob aligning with the indicia corresponding to the first predefined distance when the step rod contacts the first step, the step knob aligning with the indicia corresponding to the second predefined distance when the step rod contacts the second step.

28. The thickness planer of claim 27 in which the step block further comprises a positive stop mechanism.

* * * * *

UNITED STATES PATENT AND TRADEMARK OFFICE
CERTIFICATE OF CORRECTION

PATENT NO.    : 6,585,017 B1
DATED         : July 1, 2003
INVENTOR(S)   : Randall E. Campbell et al.

It is certified that error appears in the above-identified patent and that said Letters Patent is hereby corrected as shown below:

Column 15,
Line 23, after the word "having" insert -- a --

Signed and Sealed this

Twenty-eighth Day of October, 2003

JAMES E. ROGAN
*Director of the United States Patent and Trademark Office*